US011309691B2

(12) United States Patent
Kokkonen et al.

(10) Patent No.: US 11,309,691 B2
(45) Date of Patent: Apr. 19, 2022

(54) BUS BAR ARRANGEMENT

(71) Applicant: ABB Schweiz AG, Baden (CH)

(72) Inventors: Jesse Kokkonen, Helsinki (FI); Henri Kinnunen, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/825,380

(22) Filed: Mar. 20, 2020

(65) Prior Publication Data

US 2020/0303907 A1    Sep. 24, 2020

(30) Foreign Application Priority Data

Mar. 20, 2019 (EP) .................................... 19163956

(51) Int. Cl.
*H01F 1/01* (2006.01)
*H01F 27/245* (2006.01)
*H02B 1/20* (2006.01)

(52) U.S. Cl.
CPC .................. *H02B 1/20* (2013.01); *H01F 1/01* (2013.01)

(58) Field of Classification Search
CPC .......... H01F 1/01; H01F 1/26; H01F 17/0013; H01F 17/0033; H01F 17/045; H01F 27/245; H01F 27/266; H01F 27/255; H01F 27/2804; H01F 30/12; H01F 38/30; H01F 41/0233; H01F 41/046; H01F 41/06; H02B 1/20; H02G 5/02; Y10T 29/49071; Y10T 29/49117
USPC ........................... 174/68.2; 336/200; 323/224
See application file for complete search history.

(56) References Cited

U.S. PATENT DOCUMENTS

| | | | | |
|---|---|---|---|---|
| 6,342,778 | B1 * | 1/2002 | Catalano | H01F 17/0033 323/224 |
| 2002/0125978 | A1 * | 9/2002 | Aoki | H01F 38/30 336/5 |
| 2010/0232051 | A1 * | 9/2010 | Huang | G11B 5/0245 360/59 |
| 2014/0091788 | A1 * | 4/2014 | Misaki | G01R 19/0092 324/253 |
| 2015/0235753 | A1 * | 8/2015 | Chatani | H01F 41/0233 336/200 |
| 2017/0338656 | A1 | 11/2017 | Wagoner et al. | |

FOREIGN PATENT DOCUMENTS

| | | | | |
|---|---|---|---|---|
| JP | 2015185776 A | * | 10/2015 | ............. H01F 1/153 |
| WO | 2010025184 A1 | | 3/2010 | |

OTHER PUBLICATIONS

European Patent Office, Extended Search Report issued in corresponding Application No. 19163956.6, dated Aug. 20, 2019, 7 pp.

* cited by examiner

*Primary Examiner* — Timothy J Thompson
*Assistant Examiner* — Guillermo J Egoavil
(74) *Attorney, Agent, or Firm* — Leydig, Voit & Mayer, Ltd.

(57) ABSTRACT

A bus bar arrangement including two or more bus bars arranged for conducting currents, wherein the two or more busbars are arranged parallel and at a distance from each other, the arrangement including a magnetic structure which is arranged between two bus bars which are next to each other.

7 Claims, 3 Drawing Sheets

BUS BAR ARRANGEMENT

FIELD OF THE INVENTION

The invention relates to a bus bar arrangement, and particularly to a bus bar arrangement for potentially high currents.

BACKGROUND OF THE INVENTION

In high power applications the electrical energy is transmitted using conductors which are in a form of bars and are commonly referred as bus bars. Bus bars are substantially rigid metallic structures which are arranged either inside or outside electrical devices. Inside electrical devices the bus bars can be arranged to provide local power distribution. Such a device can be, for example, a frequency converter in which one supply unit produces DC voltage for multiple of inverters. The DC voltage is typically distributed to the inverters using DC bus bars which are common to each inverter. Inverters may be situated in parallel cabinets and the bus bars may extend through the cabinet walls. Bus bars are also used when the electrical power is fed to the supply unit and alternating power is fed to the device. Bus bars may also be employed in substations or any other devices or arrangements which require shorter or longer distance local power transmission.

Two or more current carrying conductors are influenced by each other by magnetic field generated by the current flowing in the conductors. This influence is caused by the Lorentz force and the force direction depends on the current direction in the bus bars.

$$\frac{F_m}{L} = 2k_A \frac{I_1 I_2}{r}$$

wherein $F_m$ is the magnetic force between the conductors, L is the length of the parallel conductors, kA is the magnetic force constant from the Biot-Savart law $$k_A = \frac{\mu_0}{4\pi},$$

wherein $\mu_0 = 4\pi \times 10^{-7} N/A^2$, $I_1$ is the current of the first conductor and the $I_2$ is the current of the second conductor, and r is the distance between the conductors.

If the currents in parallel bus bars flow to the same direction, the bus bars are attracted to each other, if however, the current direction in the parallel bus bars are opposite of each other, the bus bars reject each other.

Typically bus bars assemblies designed for high short circuit current (50 kA+) systems are supported to the frame or base very tightly with bus bar support insulators and if possible, separated by enough distance between the current carrying bus bars to keep the forces below certain withstand level. Arranging the bus bars far from each other increases the inductance of the circuit which might be harmful for the devices connected to the bus bar assembly depending on the application.

In some applications employing bus bar structures the levels of electrical energy are extremely high. For example utility scale (~MWh) Battery Energy Systems (BES) are able to inject vast amount of prospective short circuit current to a fault, the fault current can raise substantially larger than 100 kA, even up to 400-800 kA. These levels of currents cause tremendous forces to the bus bar system. Due to certain mechanical restrictions, it is not always feasible to support the bus bars tight enough or arrange the bus bars far enough from each other to withstand the forces. Doing such design can be costly and complex.

US 20170338656 describes an arrangement wherein a magnetic framework is positioned proximate to current carrying conductors in order to create more inductance to the circuit and thus limit the prospective short circuit current peak.

It would be desirable to obtain a bus bar arrangement in which the bus bars can be arranged at a close proximity to each other without the need for extended support structures for taking into account possible forces due to short circuit currents.

BRIEF DESCRIPTION OF THE INVENTION

An object of the present invention is to provide an arrangement so as to solve the above problem. The object of the invention is achieved by an arrangement which are characterized by what is stated in the independent claim. The preferred embodiments of the invention are disclosed in the dependent claims.

The invention is based on the idea of arranging a magnetic material structure between two bus bars so that in case of excessive current, the magnetic forces acting between the bus bars conducting the current is reduced. With the arrangement, the current conducting bus bars can be situated closer to each other without the risk of physical failures due to magnetic forces. This further enables to arrange the bus bars more easily with respect to other structures.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
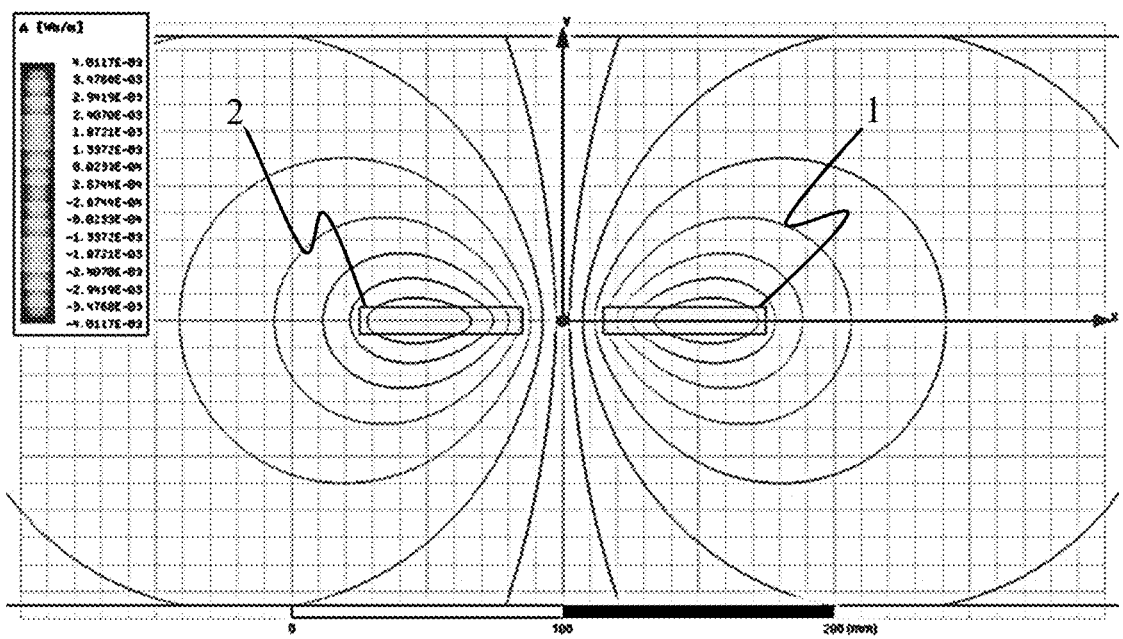
FIG. 1 shows simulated magnetic fluxes of a cross section of two parallel bus bars.

FIG. 1 shows an example of a cross section of two current carrying bus bars which are situated parallel to each other. FIG. 1 shows also the simulated magnetic field lines which are due to current in the bus bars. The field lines represent also the magnetic flux which corresponds to the magnetic field which penetrates an area. The strength of the magnetic field is represented by the density of the magnetic field lines. That is, where the magnetic field lines are closest to each other, the magnetic strength, i.e., the magnetic field level change per distance, is at the highest. As seen in FIG. 1, the magnetic field lines are closest to each other between the two bus bars, and therefore the magnetic forces are highest in the area between the bus bars. In a non-disturbed situation magnetic field naturally situates such that the field lines (showing the location of the equal level of magnetic field strength) are formed as circles wherein the centres of the circles are aligned to the centre of cross section of the bus bar, i.e. the highest centric current density location. The distance between any two field lines in such situation is even all along the circle between the two respective field lines. The larger the distance from the conductor centre the lower is the magnetic field strength and thus lower the magnetic forces between two magnetic fields. If, however, the magnetic field lines are not shaped like a perfect circle having its centre aligned with the conductor centre point, this is a sign of mechanical force which is directed to the current carrying conductor, i.e. the bus bar.

In FIG. 1, the bus bars 1, 2 are shown as cross sections. As known, bus bars are elongated pieces which conduct current. In FIG. 1, the bus bars have a width in a first direction (x), height in a second (y) direction, and they extend in the direction which is perpendicular the both x and y directions. Thus FIG. 1 shows a cross section in a plane defined by the directions x and y. The bus bars of FIG. 1 extend in a parallel manner. The strength of magnetic field decreases when moving away from the conductors. However, between the bus bars the magnetic field is at the highest and the two bus bars either attract or reject each other depending on the direction of the currents of the bus bars.

Figure 2:
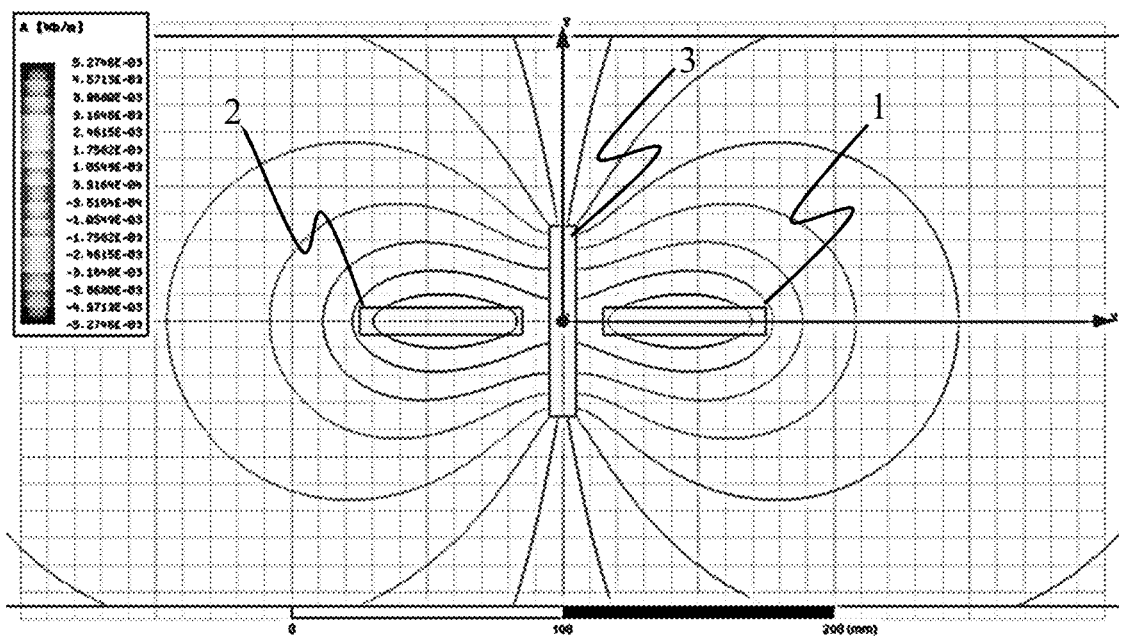
FIG. 2 shows a cross section of simulated magnetic fluxes in an embodiment of the present invention having two parallel bus bars with a magnetic structure.

According to an embodiment of the present invention, a bus bar arrangement comprises two or more bus bars 1, 2 arranged for conducting currents. The two or more bus bars are arranged parallel and at a distance from each other. As seen in FIGS. 1 and 2, the bus bars extend in parallel manner at least at the point of the cross section. In FIGS. 1 and 2 the bus bars are arranged such that their shorter sides are closest to each other, that is, the height of the bus bars 1, 2 is smaller than the width of the bus bars, and the bus bars are separated from each other in the direction of the width.

According to the present invention, the arrangement comprises a magnetic material structure which is arranged between two bus bars which are next to each other. FIG. 2 shows an embodiment of the invention in which the bus bars and the magnetic material structure are shown as cross sections. Similarly as in connection with FIG. 1, FIG. 2 shows also simulated magnetic field lines. The currents used in obtaining simulated FIGS. 1 and 2 were the same. In the invention, the magnetic material structure is arranged between two bus bars which are next to each other. FIG. 2 shows a structure with two parallel bus bars. However, the number of the bus bars is not limited to two. Two bus bars are used, for example in connection DC-voltage. However, bus bars are also used in connection with alternating voltages which typically have three phases. Voltages and currents of three phases systems may also be conducted using bus bars. When three bus bars are arranged according to the invention, the magnetic material structure may be arranged between two bus bars which are next to each other. That is, two magnetic material structures may be arranged in a system with three bus bars. If three bus bars are arranged symmetrically, as arranged in three phase cable for example, the arrangement could also comprise of three magnetic material structures, one between each phase.

FIG. 2 shows how the magnetic field lines are modified due to the magnetic material structure of the arrangement. The magnetic field lines are modified due to the fact that in the ferromagnetic core, which is formed of the magnetic material structure 3, has a higher permeability than the surrounding air. Thus the magnetic flux formed with the current carrying conductors will pass in the magnetic material structure as long as possible. As the density of the magnetic flux in the ferromagnetic core can be higher than in the air, the magnetic field lines produced by the current in one bus bar do not cross the magnetic field lines produced by the current in the other bus bar as much as without the core. As the crossing of the magnetic field lines is reduced, the forces between the bus bars are also reduced. The term "crossing" refers to situation in which two magnetic fields are shown in a same drawing without the magnetic fields affecting each other. In reality, the magnetic field lines of two magnetic fields do not cross each other. Two magnetic fields acting at the same time modify each other such that the magnetic field lines are denser is certain areas and sparser in other areas.

According to an embodiment of the invention, the bus bars 1, 2 of the arrangement are elongated structures and comprise a width and a height in the first x and second y directions correspondingly, the first and second directions being perpendicular to the direction of the length of the bus bars and the bus bars are arranged parallel at the same level, such that in a cross section of the bus bar arrangement, which is taken in the plane defined by the first and second directions, an edge of the bus bars are in a same level in the second direction y. According to the embodiment, the bus bars are arranged side-by-side at a distance from each other. The direction of length of the bus bars refer to the direction of current in the bus bars. That is, the current flows in the bus bars of FIG. 2 in the direction which is perpendicular to the first and second directions. The length of the bus bars can vary from multiple of metres to tens of centimetres. For example, when the bus bars are used in a variable speed drive which uses one supply unit and multiple of inverters, the DC voltage is typically distributed using a DC bus. Such a DC bus may extend through multiple of cabinets. On the other hand, certain installations may require that instead of cabling, bus bars are used for a certain short length.

When in the arrangement the bus bars are parallel, it means that they are at the same level in the direction of height of the bus bars. The distance between the bus bars may vary. Further, the bus bars may also have a curved form or may be bent as may be required by the installation place. Even when the bus bars are bent or folded, the arrangement of the invention reduces the magnetic forces between the bus bars when a magnetic material structure is arranged between the bus bars.

According to an embodiment, the magnetic material structure is arranged between the two bus bars such that in a cross section of the arrangement the center line of the magnetic material structure in the second direction corresponds to the center lines of the bus bars in the second direction y. As shown in FIG. 2, the magnetic material structure is between the two busbars such that the center lines of the bus bars 1, 2 and the magnetic material structure 3, i.e. magnetic core, are at the same level. FIG. 2 also shows that the height of the magnetic material structure is greater than the height of the bus bars. When the center lines are at the same level, an equal length of magnetic material structure is above and below the top and bottom of the bus bars. However, although it may be advisable to arrange the magnetic core in a centrally aligned manner with respect to the bus bars, the magnetic core may be also positioned more freely. For example the magnetic material structure does not have to have an equal distance to both of the bus bars and the magnetic material structure may not be aligned with the bus bars.

According to an embodiment, the magnetic material structure can be shaped like an arc of a circle, which is aligned with the magnetic field lines formed around the conductor. i.e the bus bar. Having the magnetic structure shaped and arranged in such way, it ensures that the magnetic field travels via the magnetic material as long as possible without interfering with the other magnetic fields of the parallel conductors.

According to an embodiment, the magnetic material structure can be placed between crossing bus bars so that the magnetic fields of the crossing bus bars do not interfere with each other, thus causing less mechanical forces to each other.

According to an embodiment, the arrangement comprises a supporting structure which is arranged to support the two or more bus bars. The supporting structure may support the bus bars individually to a surrounding structure, such as a wall or a ceiling, for example. The supporting structure is typically a structure which is attached to the busbar and to a structure. Typically the supporting structure requires insulation such that surrounding structures, to which the bus bar is supported, do not obtain hazardous voltages.

According to another embodiment, the supporting structure is arranged to support the bus bars with respect to each other. The supporting structure may be attached to each of the bus bars of the arrangement to hold them in place with respect to each other. Such a support structure may have attachment means for attachment to the bus bars and a rigid structure which hold its shape and supports the bus bars firmly.

According to an embodiment, the magnetic material structure comprises electrically insulating surface. With the use of the arrangement of the present invention, the bus bars can be situated closer to each other than without the arrangement. This also means that the magnetic material structure is close to the bus bars.

Figure 4:
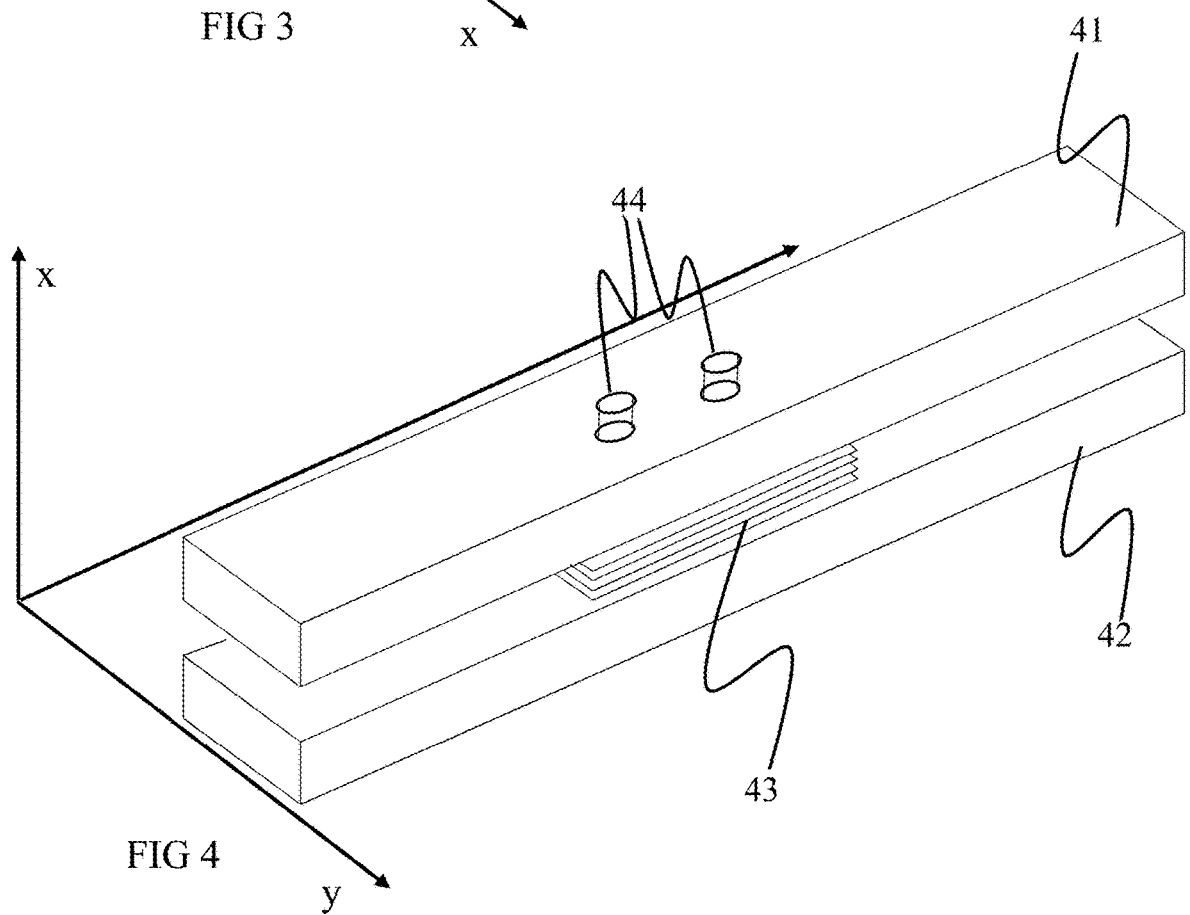

In an embodiment, the magnetic material structure forms a part of the supporting structure. Specifically, the magnetic material structure may be formed as a support structure and is in contact with the bus bars. FIG. 4 shows an embodiment with two bus bars in which the bus bars are directly attached to a magnetic material structure 43. In FIG. 4 it is shown how two bus bars 41, 42 are side-by-side with a magnetic material structure between them. It is shown that the magnetic core 43 and the bus bars are attached together using bolts 44 which penetrate through the supporting magnetic core 43 and the bus bars 41, 42. The magnetic material structure, i.e. the magnetic core, supports the bus bars and keeps the distance between the bus bars at a desired value. The supporting magnetic core provides path for magnetic flux if excessive currents flow in the bus bars and eliminates the risk of mechanical failures due to forces which could otherwise occur.

In the case where the bus bars are long, i.e. multiple of metres, it might be advisable to arrange multiple of magnetic material structures along the length of the bus bars. Multiple of magnetic material structures may be situated with even distribution to the arrangement to reduce the magnetic forces. The distribution of the magnetic material structures may also be uneven. Uneven distribution of the magnetic material structures may be advisable to suppress possible mechanical vibrations which may be induced to the bus bars due to magnetic forces. With uneven distribution the distance between consecutive magnetic material structures varies such that resonation of the bus bars can be avoided.

The physical structure of the magnetic material structure may vary. When the magnetic material structure is also used as support and it is in contact with the bus bars, the magnetic material structure may comprise a plastic outer cover which provides the required insulation to the structure. The magnetic material structure may also have multiple of magnetic cores. That is, a structure may be formed in which, for example, two magnetic cores are in a single structure. Such a structure may, for example be U shaped structure in which the straight parts include the magnetic material and it can be used in connection with three bus bars such that the straight portions of the U-shape structure are between the bus bars and the horizontal portion of the U-shape structure is situated on top of the middle bus bar. This way with a single structure two magnetic cores are produced. At the same time, the structure may give support to the bus bars. Structure may be attached with bolts through the straight portions and the bus bars.

According to preferred embodiment of the invention, the magnetic material structure comprises a pack of laminated steel sheets. Laminated steel sheets are known as such and they are able to produce magnetic core in a simple manner. The permeability of the laminated steel sheets is higher in the direction of the sheets, and preferably the pack of laminated steel sheets are arranged such that the permeability is higher in the direction of length of the bus bars. The magnetic field is then held inside the core as long as possible. The laminated steel pack is one example of a suitable core material. Other examples include ferrites, steel alloys and iron. Other benefit of utilizing stacked ferromagnetic sheets is that the eddy currents induced by the alternating current in the conductors, e.g. high frequency (kHz) current ripple, is reduced, and thus the power losses are subsequently reduced. As the magnetic material structure is placed between the bus bars, it may be advisable to leave small air gaps between the structure and the bus bars so that the structure can be more efficiently cooled. According an embodiment, the air gaps can also be arranged between the layers of the ferromagnetic stack.

Figure 3:
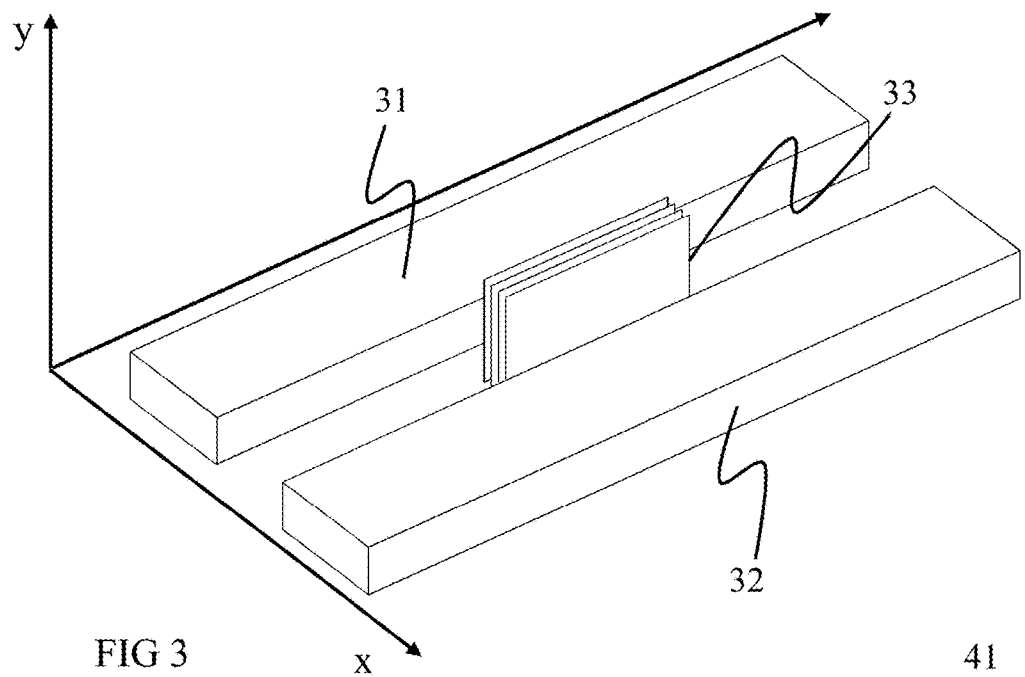
FIGS. 3, 4 and 5 show embodiments of the invention.

FIG. 3 shows a perspective view of the arrangement of the invention with a laminated steel pack as the core structure 33 positioned between bus bars 31, 32. In the example of FIG. 3, the magnetic core structure 33 is shown such that the direction of the laminations is clearly visible.

Figure 5:
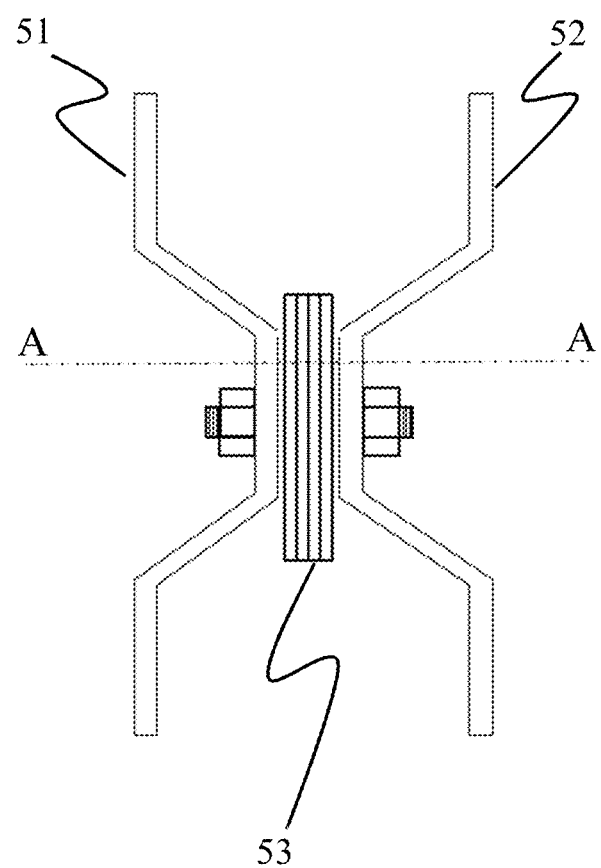

FIG. 5 shows an embodiment of the present invention. In the embodiment the dashed line A-A is an imaginary wall or other structure through which the two bus bars 51, 52 are led. With the arrangement of the invention, the bus bars 51, 52 can be brought closer to each other at the position of the wall so that the opening in the wall can be made smaller. On both sides of the wall the distance between the bus bars 51, 52 is increased. At the position of the wall a magnetic material structure 53 is arranged between the two bus bars 51, 52. In the shown structure the possible magnetic forces are limited by arranging the bus bars 51, 52 at a suitable distance from each other and in the position of the wall by arranging the magnetic core 53 between the bus bars.

According to an embodiment, the ferromagnetic material and stack cross section can be chosen according to the expected largest fault current, i.e. short circuit current, flowing in the bus bars, such that preferably the ferromagnetic stack is chosen not to saturate with the fault current. However, even if the ferromagnetic stack would saturate, it still helps to reduce the forces between the bus bars as part of the magnetic field goes via the ferromagnetic material. Having the ferromagnetic material chosen with higher permeability or having larger ferromagnetic material cross section will enhance the level of saturation. It will be obvious to a person skilled in the art that, as the technology advances, the inventive concept can be implemented in various ways. The invention and its embodiments are not limited to the examples described above but may vary within the scope of the claims.

The invention claimed is:

1. A bus bar arrangement comprising: two or more bus bars arranged for conducting currents, wherein the two or more busbars are arranged parallel and at a distance from each other; and a magnetic material structure which is arranged between two bus bars which are next to each other, and wherein the magnetic material structure is in contact with at least two bus bars of the bus bar arrangement;
   wherein the arrangement comprises a supporting structure which is arranged to support the two or more bus bars,
   wherein the supporting structure is arranged to support the bus bars with respect to each other,
   wherein the magnetic material structure has a higher permeability in the second direction y and in the direction of length of the bus bars than in the first direction x,
   wherein the magnetic material structure has a height which is greater than the height of the bus bars,
   wherein the magnetic material structure comprises electrically insulating surface, and
   wherein the magnetic material structure comprises a pack of laminated steel sheets.

2. The arrangement according to claim 1, wherein the bus bars of the arrangement are elongated structures and comprise a width and a height in the first x and second y directions correspondingly, the first and second directions being perpendicular to the direction of the length of the bus bars and the bus bars are arranged parallel at the same level, such that in a cross section of the bus bar arrangement, which is taken in the plane defined by the first and second directions, an edge of the bus bars are in a same level in the second direction y.

3. The arrangement according to claim 1, wherein the magnetic material structure is arranged between the two bus bars, and in a cross section of the arrangement the center line of the magnetic material structure in the second direction corresponds to the center lines of the bus bars in the second direction y.

4. The arrangement according to claim 1, wherein the magnetic material structure forms a part of the supporting structure.

5. The arrangement according to claim 1, wherein the magnetic material structure is attached to at least two bus bars of the bus bar arrangement.

6. The arrangement according to claim 2, wherein the magnetic material structure is arranged between the two bus bars, and in a cross section of the arrangement the center line of the magnetic material structure in the second direction corresponds to the center lines of the bus bars in the second direction y.

7. The arrangement according to 4, wherein the magnetic material structure is attached to at least two bus bars of the bus bar arrangement.

* * * * *